(12) United States Patent
Quaile et al.

(10) Patent No.: US 8,949,163 B2
(45) Date of Patent: Feb. 3, 2015

(54) ADOPTION SIMULATION WITH EVIDENTIAL REASONING USING AGENT MODELS IN A HIERARCHICAL STRUCTURE

(71) Applicant: General Electric Company, Schenectady, NY (US)

(72) Inventors: James Patrick Quaile, Largo, FL (US); Maxim V. Garifullin, Palatine, IL (US); Jerrold Allen Cline, Niskayuna, NY (US); Shanshan Wang, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 303 days.

(21) Appl. No.: 13/677,613

(22) Filed: Nov. 15, 2012

(65) Prior Publication Data

US 2013/0124441 A1    May 16, 2013

Related U.S. Application Data

(60) Provisional application No. 61/560,580, filed on Nov. 16, 2011.

(51) Int. Cl.
*G06F 17/00*  (2006.01)
*G06N 5/02*  (2006.01)
*G06N 5/04*  (2006.01)
*G06N 7/00*  (2006.01)

(52) U.S. Cl.
CPC ............ *G06N 5/02* (2013.01); *G06N 5/043* (2013.01); *G06N 7/005* (2013.01)
USPC .......................................................... 706/45

(58) Field of Classification Search
CPC ...................................................... G06Q 10/04

USPC .......................................... 706/12, 45, 47, 62
See application file for complete search history.

(56) References Cited

U.S. PATENT DOCUMENTS 5,058,033 A    10/1991  Bonissone et al.
5,832,465 A    11/1998  Tom
5,991,743 A    11/1999  Irving et al.
(Continued)

OTHER PUBLICATIONS

Zhi et al., "Agent-Based Electricity Market Simulation With Plug-In Hybrid Electric Vehicle Penetration," Power and Energy Society General Meeting, 2011 IEEE, Jul. 24-29, 2011, pp. 1-2.
(Continued)

*Primary Examiner* — David Vincent
(74) *Attorney, Agent, or Firm* — Joseph J. Christian (57) ABSTRACT

A method and system for an agent-based evidential reasoning decision computer system for determining an adoption rate of a trend is provided. The system includes a plurality of nodes arranged in a tree structure. The plurality of nodes define an evidential reasoning algorithm where lower level nodes receive factors to be considered in the decision and each node assigns a likelihood of an outcome of the received factors, and generates an output to a subsequent higher level node or root of the tree structure. The system also includes a plurality of agent models organized in a hierarchical structure, each agent model comprising a respective set of the plurality of nodes and an output of the agent model, each agent model representing a member of a population, and an aggregator algorithm configured to combine the outputs of the plurality of agent models to generate an output representing an adoption rate.

4 Claims, 10 Drawing Sheets

(56) References Cited

U.S. PATENT DOCUMENTS

| | | |
|---|---|---|
| 6,951,008 B2 | 9/2005 | Quaile |
| 8,195,436 B2 | 6/2012 | Tolone et al. |
| 2007/0018953 A1 | 1/2007 | Kipersztok |
| 2009/0271358 A1 | 10/2009 | Lindahl et al. |
| 2011/0320374 A1 | 12/2011 | Wang et al. |
| 2012/0070804 A1 | 3/2012 | Pang et al. |
| 2012/0158640 A1 | 6/2012 | Venditti et al. |

OTHER PUBLICATIONS

Sullivan et al., "PHEV Marketplace Penetration: An Agent Based Simulation," University of Michigan, Transportation Research Institute (UMTRI), Jul. 2009, pp. 1-44.

Hiwatari et a., "A Road Traffic Simulator to Analyze Layout and Effectiveness of Rapid Charging Infrastructure for Electric Vehicle," Vehicle Power and Propulsion Conference (VPPC), 2011 IEEE, Sep. 6-9, 2011 (6 pgs).

Zhang et al., "A Study of the Diffusion of Alternative Fuel Vehicles: An Agent-Based Modeling Approach," Journal of Product Innovation Management, vol. 28, Issue 2, Mar. 2011, pp. 152-168.

ADOPTION SIMULATION WITH EVIDENTIAL REASONING USING AGENT MODELS IN A HIERARCHICAL STRUCTURE

CROSS REFERENCE TO RELATED APPLICATIONS

This application claims the benefit of U.S. Provisional Patent Application No. 61/560,580 filed Nov. 16, 2011, which is hereby incorporated by reference in its entirety.

BACKGROUND OF THE INVENTION

The field of the invention relates generally to modeling techniques for estimating adoption of trends, and more specifically, to a system and method for predicting associated needs related to the use of electric vehicles.

Electric vehicles are relatively new to the marketplace. Many businesses and government agencies would like to forecast the use of these vehicles by specific locations. Unfortunately, there is little historic data that could be used for traditional mathematical modeling. One approach that can be used in the absence of data is to use models based on expert knowledge. This is especially important if there are many heterogeneous factors can affect the likelihood of consumers to adopt electric vehicles. Capturing expert knowledge in a form that can be used in software-based models has long been a challenge.

The roots of the approach can be found in medical diagnostics. This approach originally attempted to simulate the thought process of physicians that attempt to reason over several pieces of evidence to arrive at a diagnosis. This process uses a mathematical technique to "accumulate" evidence to evaluate a hypothesis. A particular approach described in U.S. Pat. No. 6,951,008, to the instant inventor, established the mathematical details of this approach but not the difficulty of formulating a model structure and of extracting knowledge from experts to calibrate the models.

At least some known agent-based models tend to use multiple types of agents which interact strongly with each other. There is an underlying assumption that all agents behave in a logical fashion and are driven by a limited set of factors, mostly financial. These models tend to be difficult for non-modeling experts to understand which tend to reduce the credibility of the output. Additionally, the purchasing decision for electric vehicles is not always highly logical but can be based on other subjective types of factors such as image enhancement.

BRIEF DESCRIPTION OF THE INVENTION

In one embodiment, an agent-based evidential reasoning decision computer system for determining an adoption rate of a trend is provided. The system includes a processor and a computer-readable storage device having encoded thereon computer-executable instructions that are executable by the processor to perform functions. The system further includes a plurality of nodes arranged in a tree structure, a topology of the tree structure determined by a subject matter expert in an area of the decision wherein the topology defines a hierarchy of the tree structure and an interconnection of the nodes. The plurality of nodes define an evidential reasoning algorithm where lower level nodes receive factors to be considered in the decision and each node assigns a likelihood of an outcome of the received factors, and generates an output to a subsequent higher level node or root of the tree structure. The system also includes a plurality of agent models organized in a hierarchical structure, each agent model comprising a respective set of the plurality of nodes and an output of the agent model, each agent model representing a member of a population, and an aggregator algorithm configured to combine the outputs of the plurality of agent models to generate an output representing an adoption rate.

In another embodiment, a computer-implemented method for determining an adoption rate of a trend by a plurality of potential adopters is provided. The plurality of potential adopters defines a population. The adoption rate define a rate of the spread of the trend through the population wherein the trend relates to a pattern of a change in usage of a technology area by the population. The method is implemented using a computer device coupled to a memory device wherein the method includes receiving a set of factors, determined by an expert in the technology area, the received set of factors representing facts to be considered in determining the adoption rate, applying the set of factors to a plurality of agent models, each agent model representing one or more of the users, each of the agent models including a hierarchical reasoning algorithm including a plurality of decision nodes, each algorithm configured to generate a score for the hierarchical reasoning algorithm based on the applied set of factors, and applying the generated scores to an adoption forecasting model configured to combine the scores of the agent models to generate an adoption rate for the population based on the applied set of factors, and outputting the generated adoption rate to a user.

In yet another embodiment, one or more non-transitory computer-readable storage media include computer-executable instructions embodied thereon, wherein when executed by at least one processor, the computer-executable instructions cause the processor to receive a set of factors, determined by an expert in the technology area, the received set of factors representing facts to be considered in determining the adoption rate, apply the set of factors to a plurality of agent models, each agent model representing one or more of the users, each of the agent models including a hierarchical reasoning algorithm including a plurality of decision nodes, each algorithm configured to generate a score for the hierarchical reasoning algorithm based on the applied set of factors, apply the generated scores to an adoption forecasting model configured to combine the scores of the agent models to generate an adoption rate for the population based on the applied set of factors, and output the adoption rate.

BRIEF DESCRIPTION OF THE DRAWINGS

FIGS. 1-10 show exemplary embodiments of the method and system described herein.

DETAILED DESCRIPTION OF THE INVENTION

The following detailed description illustrates embodiments of the invention by way of example and not by way of limitation. It is contemplated that the invention has general application to analytical and methodical embodiments of modeling an expert decision-making process in industrial, commercial, and residential applications.

As used herein, an element or step recited in the singular and preceded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

Embodiments of the present disclosure use an agent-based adoption model to estimate an adoption of a trend, for example, adoption of owning electric vehicles (EV) at a selectable granular level, such as, a zip-code level. In one embodiment, the model incorporates an adoption model, for example, a Bass Diffusion model, a supply element, and expert reasoning to duplicate a multi-factored decision as to whether a particular consumer or a population of consumers will be likely to purchase an EV or internal combustion engine (ICE) vehicle. Each consumer is modeled as an agent with their unique characteristics such as commute distance, household income, ability to install home charger, and others determined by experts or focus groups. These elements are fed into the leaves of a decision tree, along with financial calculations on payback and operating costs. Each agent has its own decision tree, and when the agent is evaluating the purchase of a new vehicle the tree determines the consumer's propensity to buy an EV. The creation and placement of synthetic agent populations is aided by granular U.S. Census data that contains distributions for many of these quantities aggregated at the 5-digit zip-code level. In one example, the output of the agent-based adoption model is shown on a zip-code map of New York State.

Given the importance of EVs, a better understanding of the potential adoption of EVs and the required charging infrastructure to support EVs permits a more economical and efficient selection and deployment of resources. Potential EV adopters may be considered as a heterogeneous pool with different driving commutes, different household incomes, different views of or different attitudes toward "Green" technology. An agent-based approach is used to purposefully model these differences. The decision of which car to purchase has many factors for a potential adopter. Some of these factors are not purely logical (image, style) and some are driven by financial metrics (first cost, mileage, etc.). Brand loyalty is an obvious non-logical factor where buyers will stay with a brand sometimes over generations in a family. Understanding how customers use (reason over) these factors to make choices is as important as enumerating the factors, which is a separate challenge. This is even more important for EV adoption because there is historical data with which to derive behavioral models.

Embodiments of the present disclosure determine model factors that may influence people to purchase an EV. More specifically, the software modeling techniques and environments described herein facilitate model development. Embodiments of the present disclosure also model the multiple factors that drive EV adoption in an easy-to-understand manner through the use of reasoning technology to simulate the thought process of potential customers to quantify those factors for their preference of purchasing an EV verses a conventional car.

In addition to agent-based and expert reasoning, the model also provides geographic granularity, because much of the data describing the agents is available at a granular geographic level (e.g. 5-digit zip code). In various embodiments, U.S. Census data is used for some of the required descriptors, which provides that the model output has relatively granular geographic detail. Moreover, in addition to estimating an overall level of EV adoption the model outputs show geographically where that EV adoption is expected to occur given different properties of the regional population and infrastructure resulting in EV adoption maps that are useful to utilities making grid investments and municipalities making charger infrastructure investments.

The decision to adopt electric vehicles is influenced by a multitude of factors. Embodiments of the present disclosure utilize a reasoning approach to postulate the preference of a potential adopter for electric vehicles. In one embodiment, example based evidential reasoning (EBER) is used to capture human reasoning over multiple heterogeneous factors. EBER captures the subject matter expert's thought process in a form that can that can be built into software models. EBER uses a mathematical technique to "accumulate" evidence to evaluate a hypothesis.

Figure 1:
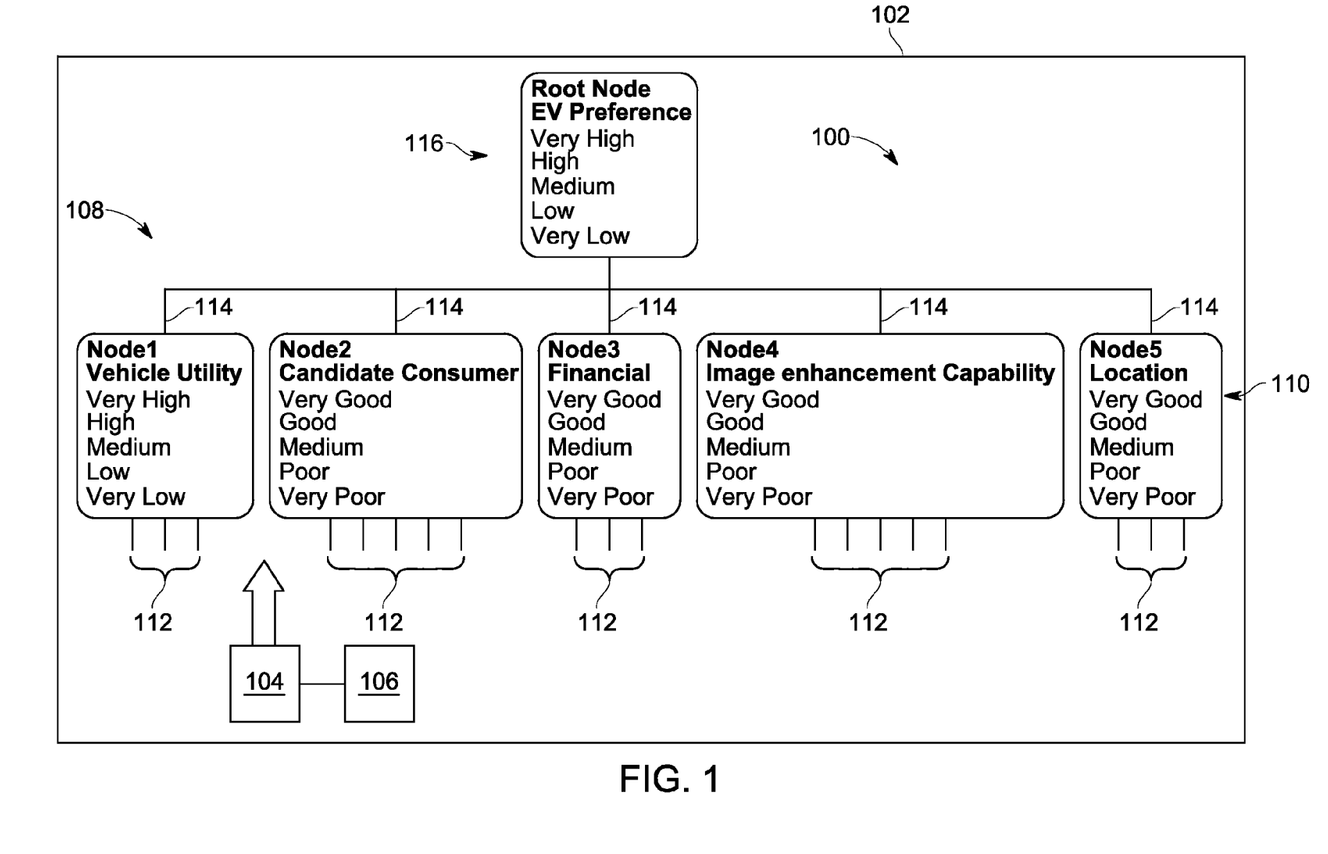
FIG. 1 is a schematic block diagram of an example based evidential reasoning (EBER) structure of an agent determining an adoption rate of a trend.

FIG. 1 is a schematic block diagram of an EBER 100 structure of an agent 102 for determining an adoption rate of a trend. In the exemplary embodiment, system 102 is implemented using a processor 104 and a computer-readable storage device 106 communicatively coupled to processor 104. Computer-readable storage device 106 having encoded thereon computer-executable instructions that are executable by processor 104 to perform functions described herein. In the exemplary embodiment, structure 100 includes a plurality of nodes 108 arranged in a tree structure, a topology of the tree structure is determined by a subject matter expert in an area of the decision. The topology defines a hierarchy of the tree structure and an interconnection of plurality of nodes 108. Plurality of nodes 108 define an evidential reasoning algorithm where lower level nodes 110 receive factors 112 to be considered in the decision. Each node 108 assigns a likelihood of an outcome of the received factors 112, and generates an output 114 to a subsequent higher level node 116 or root of the tree structure. Values of outputs 114 may be, for example, one of five different values, based on the values of received factors 112

EBER uses a tree structure to capture a process of aggregating evidence. At the top of the tree is a root node 116 representing the hypothesis to be evaluated. Root node 116 can have multiple child nodes 110, which in turn can have child nodes (not shown) of their own. The tree structure can be as complex as necessary to capture the set of facts to be considered. At the bottom of the tree, leaf nodes 110 represent the data inputs 112 used for determining the decision. The nodes 108 in the model structure represent intermediate or final considerations in the decision process. Each parent node contains a number of attributes (child nodes) describing factors to be considered in evaluating that parent node. Each child node or attribute has a number of possible values expressed linguistically. For example, the node "EV Preference" has five linguistic values: very high, high, medium, low, or very low.

The linguistic values are mapped to numeric certainty factors at the nodes using, for example, a simple one-to-one correspondence. The certainty factors express the degree to which the linguistic values support the positive hypothesis or topmost linguistic in its parent node. For example, to what degree does Good "Location" value support a Very High "EV Preference"? The higher the certainty factor, the higher is the degree of confidence in the hypothesis. Therefore, the values of certainty will decrease from top to bottom in nodes. A value of +1 indicates complete confidence and that of −1 indicates no confidence. EBER addresses the challenge of assigning certainty values by treating them as parameters to be optimized based on the experts' opinions. Translating source linguistic evidence to certainty is a simple one-to-one correspondence, which is implemented with look-up tables. The following is an example of source evidence translation:

If the linguistic evidence is "high," the numerical value is 0.8.

If the linguistic evidence is "medium," then numerical value is 0.1.

If the linguistic evidence is "low," then numerical value is −0.5.

The actual values are assigned during a calibration process which uses example situations to elicit expert opinion. EBER system 100 combines the numeric values for all of the attributes (child nodes) of a parent node and uses the result to form an opinion for the parent node. In one embodiment, a MYCIN function is used to combine numeric evidential values at the nodes.

Figure 2:
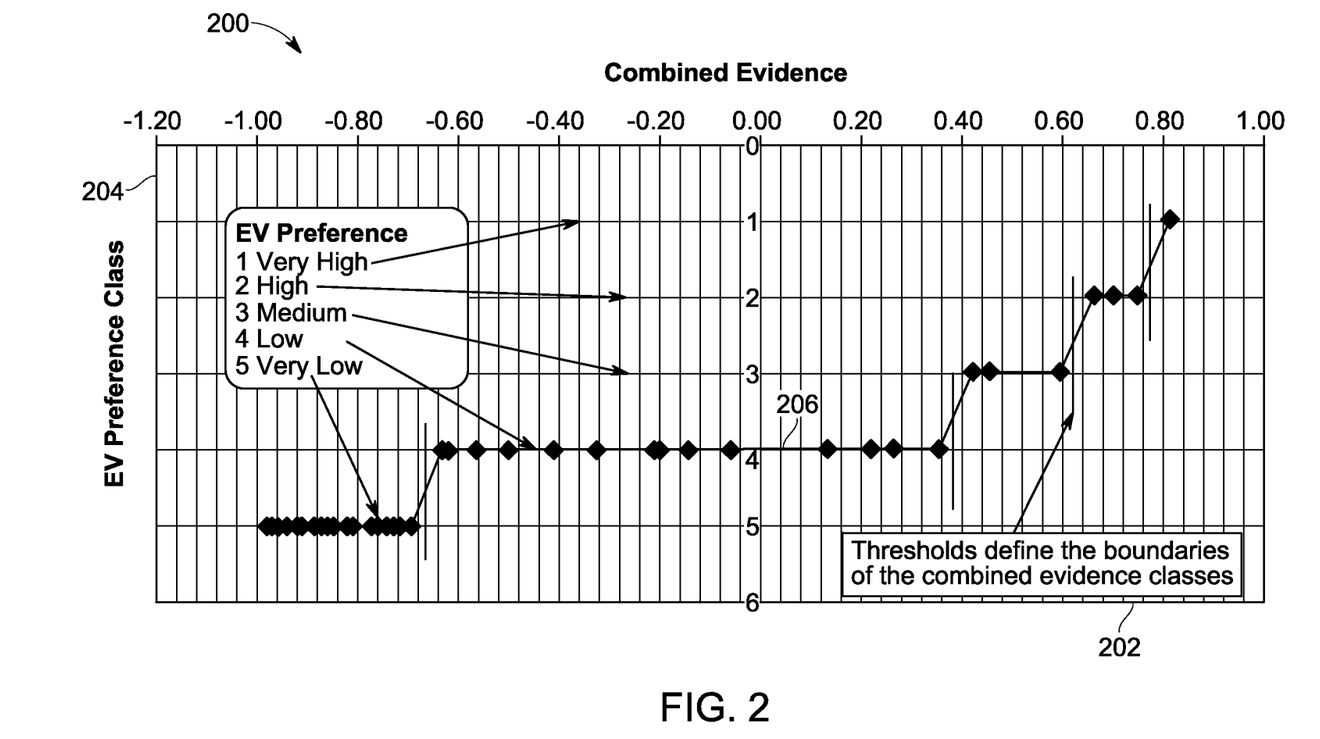
FIG. 2 is a graph illustrating the conversion of aggregate evidence score to categorical decision for parent node shown in FIG. 1 arrayed in ranges.

FIG. 2 is a graph 200 illustrating aggregate evidence for parent node 116 (shown in FIG. 1) arrayed in ranges. In the exemplary embodiment, graph 200 includes an x-axis 202 graduated in units of evidence and a y-axis 204 graduated in units of preference for an electric vehicle. A trace 206 represents Experts' opinions of example cases.

After an aggregated value of parent node 116 is determined the value is mapped to a linguistic value at the node using threshold ranges. The threshold ranges separate the possible values output space into contiguous non overlapping intervals. The thresholds are determined during the calibration phase. The following is an example of the values used to translate aggregate values into linguistic terms:

If the aggregate value is greater than 0.78, then the linguistic output is "Very High."

If the aggregate value is between 0.62 and 0.78, then the linguistic output is "High."

The opinion from each node is then propagated to the immediate higher-level node where it becomes the linguistic evidential value for the appropriate attribute in that higher-level node. The linguistic evidential values at the higher-level nodes are then converted to numeric evidential values and combined to formulate additional opinions. This process continues until a final opinion is formulated at the highest node in the model structure.

Figure 3:
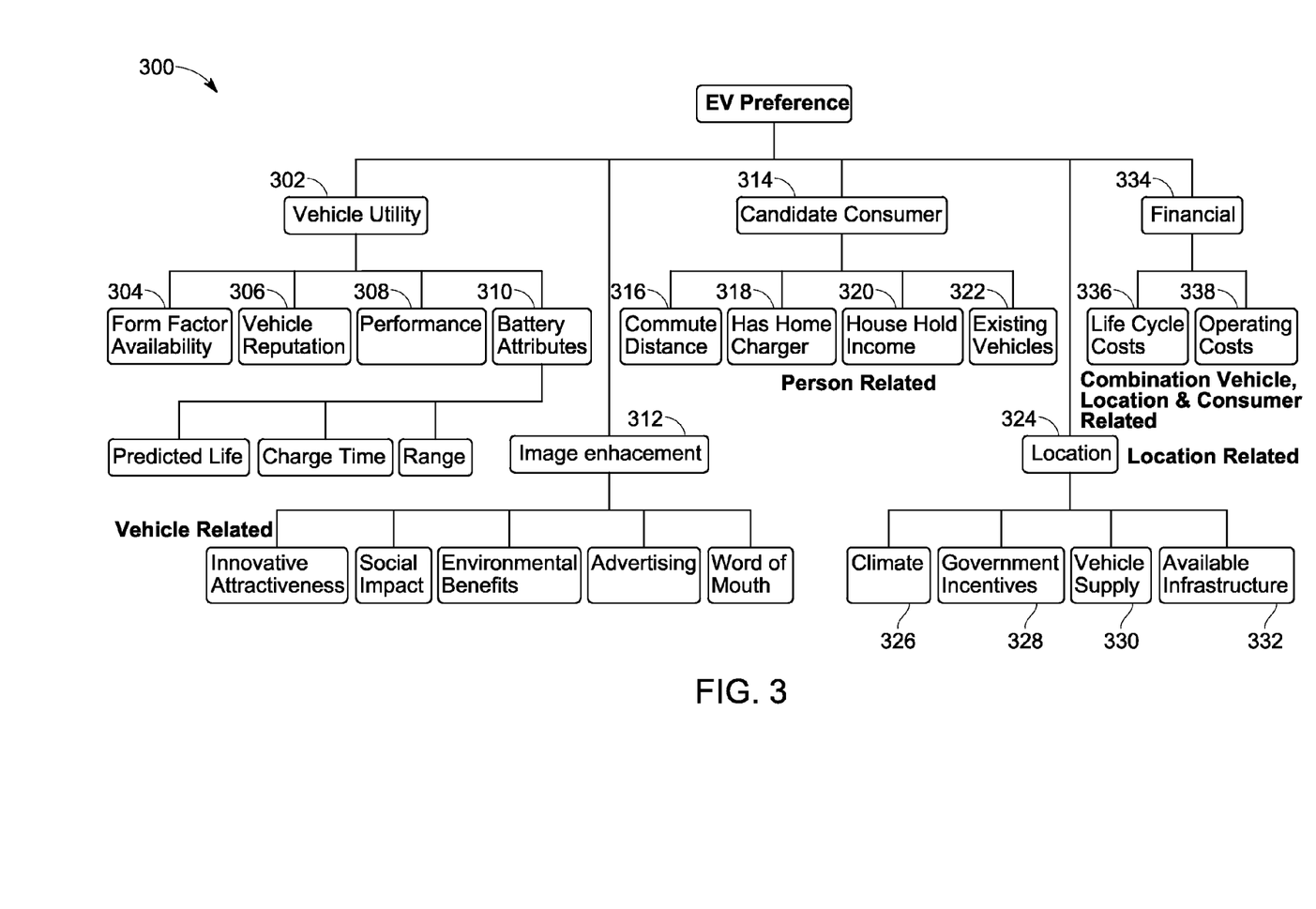
FIG. 3 is a block diagram of an EBER tree illustrating a structure that subject matter experts form to order factors to make the decision in accordance with an exemplary embodiment of the present invention.

FIG. 3 is a block diagram of an EBER tree 300 illustrating a structure that subject matter experts form to order factors to make the decision in accordance with an exemplary embodiment of the present invention. In the exemplary embodiment, a consumer's preference for an EV is assumed to be driven by five major categories:

1) Vehicle Utility 302, which is a measure of how well an electric vehicle is valued in the market in general. Potential aspects included in the model are:
   a) Form factor availability 304 which is a measure of vehicle availability of the desired color, number of doors, size, etc.
   b) Vehicle reputation 306 may play an important role for many adopters if they consider their first venture into EV ownership and have no experience on which to form an opinion.
   c) Performance 308 of electric vehicles can be different than typical internal combustion vehicles and may represent a one of the factors determining the adoption decision.
   d) Battery 310 attributes are important because the scope of this disclosure is to pure battery driven vehicles. Aside from the large cost implications the battery's range and charging characteristics are likely to be strong drivers in the purchase decision.

2) Image Enhancement Capability 312 captures the impact of softer vehicle characteristics such as the ability to enhance the image of the owner and appeal to first adopters.

3) Candidate Consumer 314 examines factors about the consumer that may affect his propensity to purchase an electric vehicle.
   a) Commute Distance 316
   b) Has Home Charger 318 or the ability to install one enhances the usefulness of an EV. For instance, homes with driveways or garages have a greater ability to install chargers than rented apartments.
   c) Household Income 320 is postulated to affect a candidates EV preference. As income levels increase the ability to afford an EV increases.
   d) Existing Vehicles 322 may influence the desire for EVs because one can choose the EV for the subset of driving missions to which it is best suited.

4) Location 324 examines factors related to geographic location of the potential buyer which drive the suitability of electric vehicles.
   a) Climate 326 has a strong impact on EV performance and range. Ancillary power requirements such as heat and air conditioning must be supplied from the battery and can substantially reduce range. Temperature extremes impact the life and performance of batteries.
   b) Government Incentives 328 can increase the appeal of EVs by reducing the relative cost difference between the EVs and ICE vehicles.
   c) Vehicle Supply Or Availability 330 may differ geographically and have an effect on the adoption decision.
   d) Available Infrastructure 332 is an important influence for pure battery EVs because available infrastructure determines the number and quality of missions the EV can undertake.

5) Financial 334 tree considers both the lifecycle costs 336 and operating costs 338 of electric vehicle. Part of a consumer's purchasing preference is driven by the financial aspects of the vehicle and its operation. This is captured in the EBER tree 300 as inputs from the two financial models 336 and 338, which calculate the annual operating savings and the payback in years.

Figure 4:
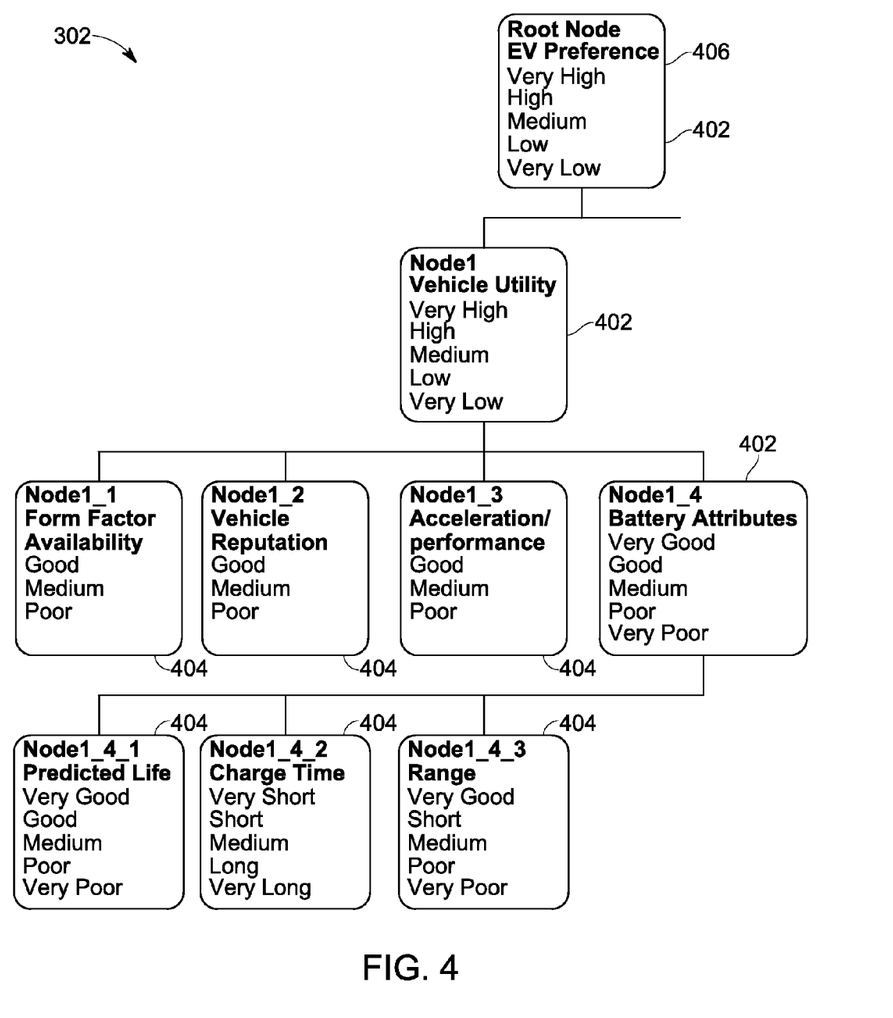
FIG. 4 is a block diagram of vehicle utility branch of tree shown in FIG. 3.

FIG. 4 is a block diagram of Vehicle utility 302 branch of tree 300 (shown in FIG. 3). In an agent-based simulation each car buyer is modeled as a consumer agent. Each car buyer has particular attributes that are generated in the process of population synthesis as discussed in greater detail below. Each agent has their own instance of the EBER tree that decides its buying preference. To accomplish this, the EBER algorithm may be implemented in a software simulation tool to process the MYCIN formulae, to define the tree structure and to allow a graphic depiction of the tree for each agent. The ability to display a graphic rendering of the tree is important both from a debugging perspective and for model transparency, such that how the model is treating vehicle preferences can be explained. For example, consider the portion of overall tree 300 dealing with vehicle utility 302. In the software simulation tool this is modeled using a set of graphical nodes. To accomplish this, a graphical node object was defined which can be replicated as required, placed on the object's palette and arranged to form the tree structure.

There are two fundamental types of nodes, inner nodes 402, which have children and leaf nodes 404, which do not. The attributes for leaf nodes include its semantic values, certainty factors and colors. The attributes for inner nodes add an additional attribute which are the thresholds used to decode its value when it aggregates the certainty factors of its children. There is also root node 406 that is the inner node at the very top of the tree.

The tree is built at model start up and an instance is included in every consumer agent created. Unique input values are supplied to the leaf nodes of each agent's tree which are used to determine which semantic and a corresponding certainty factor it is assigned. The entire tree is then calculated with root node 406 indicating the level of preference for electric vehicles.

Figure 5:
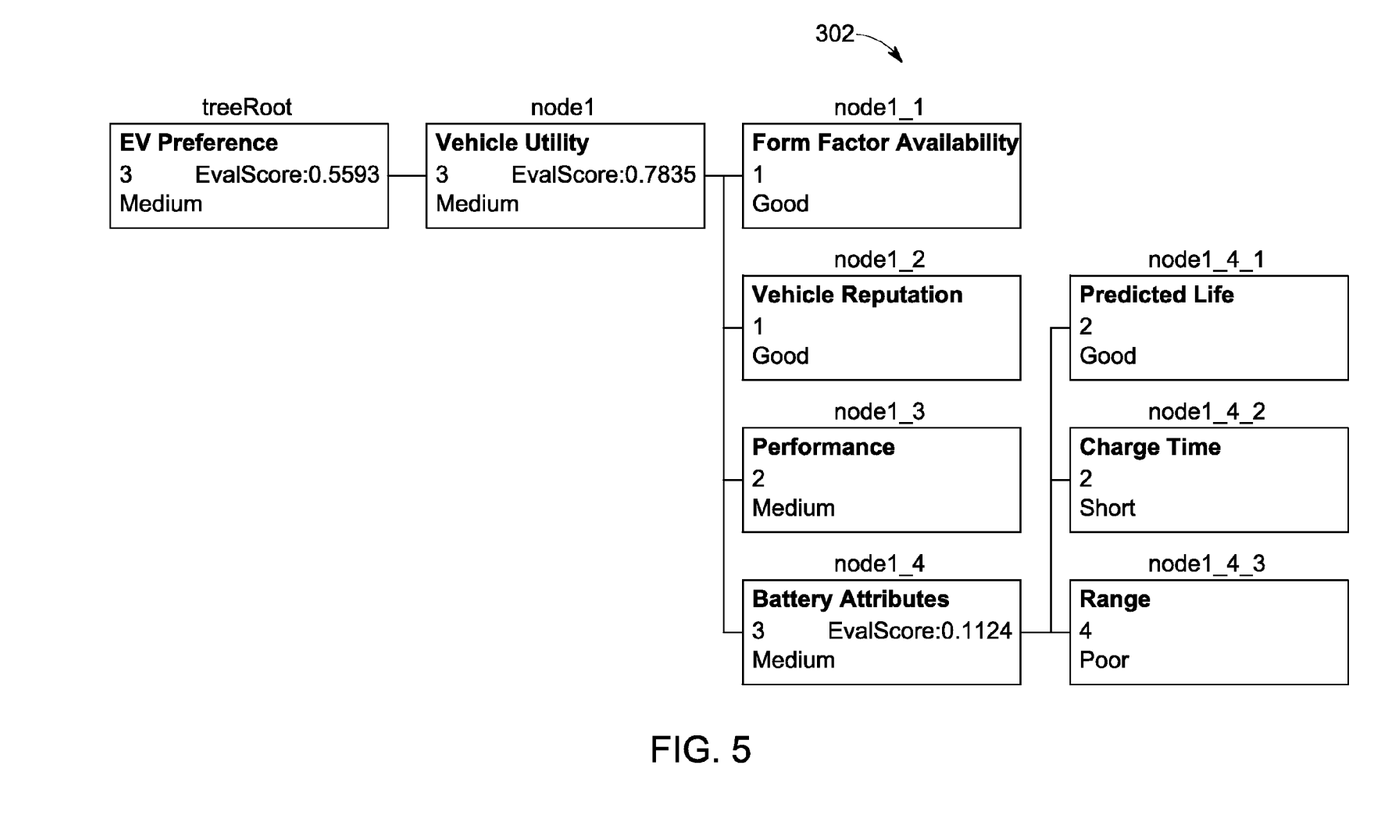
FIG. 5 is a block diagram of the vehicle utility branch of the tree shown in FIG. 3 instantiated for one of the agents in accordance with an exemplary embodiment of the present disclosure.

FIG. 5 is a block diagram of Vehicle utility 302 branch of tree 300 (shown in FIG. 3) instantiated for one of the agents in accordance with an exemplary embodiment of the present disclosure. In the exemplary embodiment, the EBER is integrated with an adoption forecasting model that may include a Riccati equation, such as, but not limited to a Bass Diffusion Model.

The output from the tree, which indicates the consumer's preference to purchase an electric vehicle, is sent to a modified agent-based version of the Bass Diffusion model. Each consumer agent has an instance of the model tracking its state through time. In this version of the diffusion model the potential adopter has two choices, to adopt EV, or to adopt ICE. Consumers start out as potential adopters and periodically check their interests in buying a vehicle. This probability if a consumer decides to purchase a vehicle is determined by the score of its preference tree. A value of +1 indicates the consumer is surely trying to buy an EV, 0 indicates a 50% chance of preferring an EV and −1 means that the consumer is trying to get an ICE.

Figure 6:
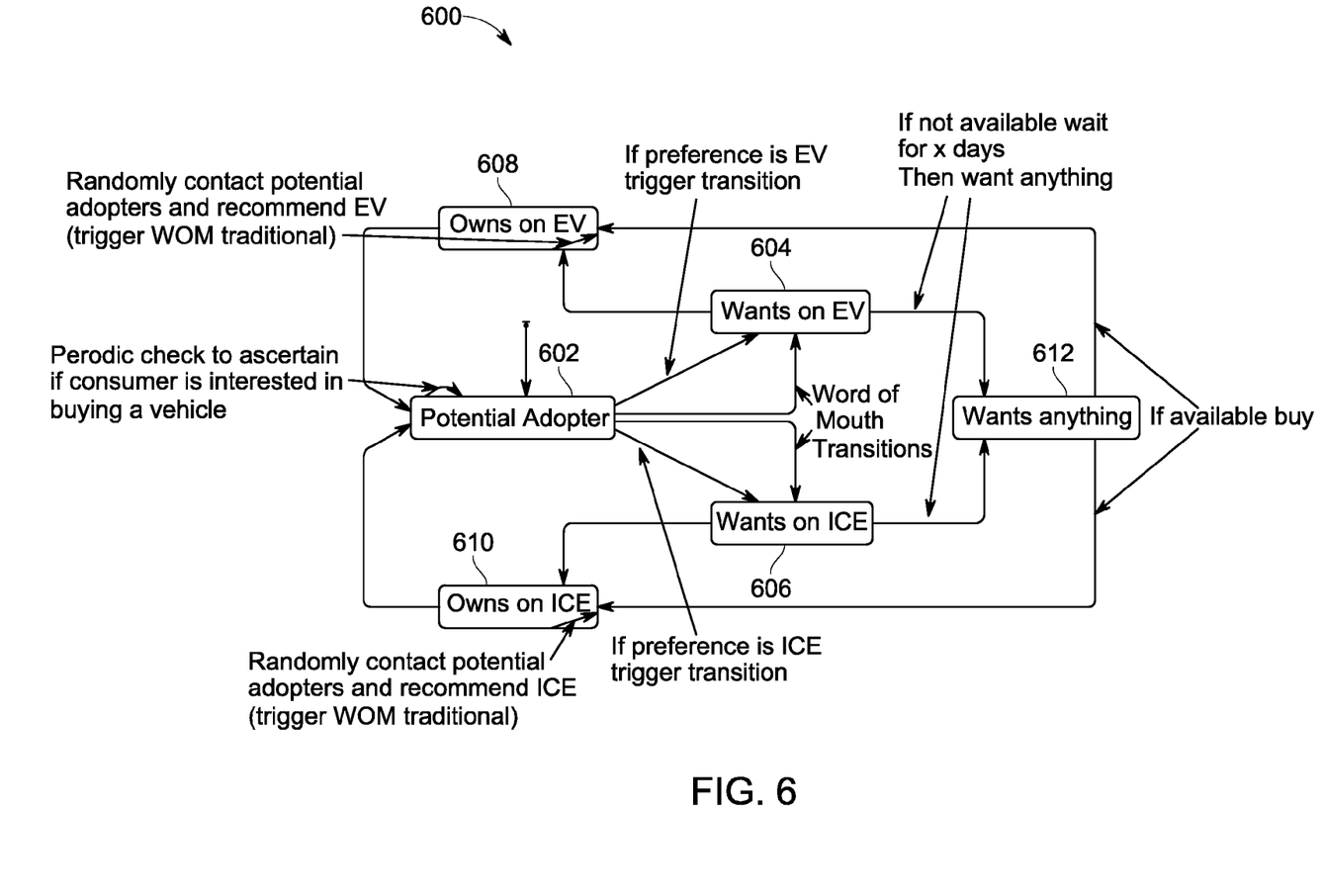
FIG. 6 is a block diagram of a Bass diffusion state chart in accordance with an exemplary embodiment of the present disclosure.

FIG. 6 is a block diagram of a Bass diffusion state chart 600 in accordance with an exemplary embodiment of the present disclosure.

The agent starts in a potential adopter state 602. After a decision has been made, the agent transitions into one of two states, wants an EV 604, or wants an ICE 606. If the type of car desired is available the agent purchases the car and transitions to an own state either owns an EV 608 or owns an ICE 610. If the type of car desired is not available the agent waits a specified length of time required to become available after which it transitions to a wants anything state 612 where it chooses the first type of car to be available. Once an agent owns a car the agent periodically sends messages to potential adopters suggesting that the potential adopters purchase the type of car the agent owns by word-of-mouth (WOM). Once a potential adopter receives such a message the potential adopter transitions to wanting that type of vehicle and follows the same logic stated above. The agent is assumed to keep a car for a specified length of time and then discards it and returns to being a potential adopter.

Figure 7:
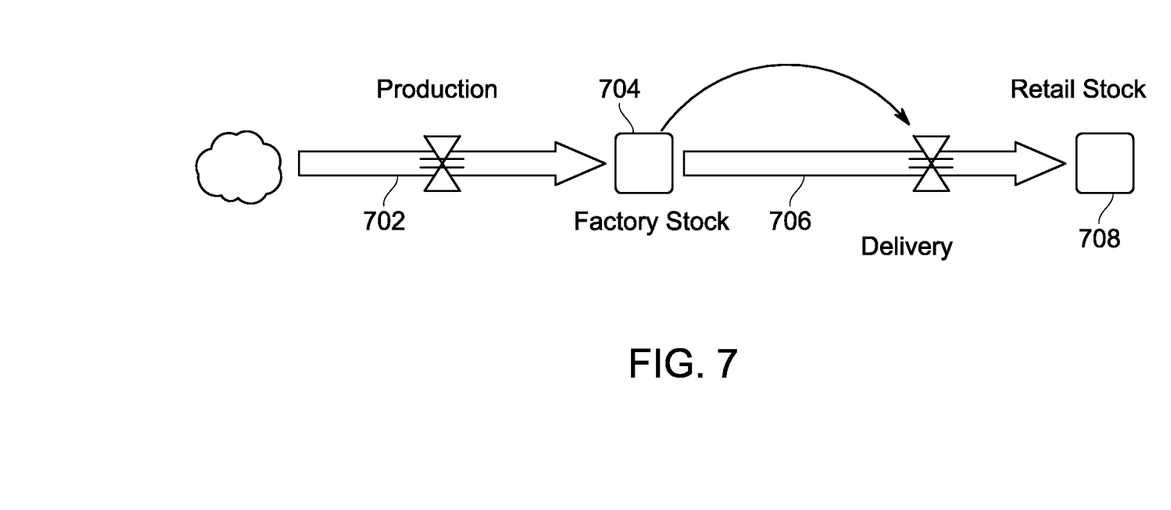
FIG. 7 is a block diagram of a simple system dynamics supply chain model in accordance with an exemplary embodiment of the present disclosure.

FIG. 7 is a block diagram of a simple system dynamics supply chain model 700 in accordance with an exemplary embodiment of the present disclosure. The notion of availability is introduced utilizing two simple supply chain models an example of which is shown in FIG. 7. Each type of car has its own supply chain 700. In this approach a production rate 702 is related to a demand for the type of vehicle as measured by a number of consumers in the wants an EV 604 state or wants an ICE 606 state. Production rate 702 tends to increase a level of factory stock 704 while a delivery rate 706 tends to reduce the level of factory stock. Delivery rate 706 increases with factory stock levels 704. A retail stock level 708 is a difference between cars delivered and cars sold.

Part of a consumer's purchasing preference is driven by the financial aspects of the vehicle and its operation. This is captured in the EBER tree 300 as inputs from two financial models 336 and 338 (shown in FIG. 3), which calculate the annual operating savings and the payback in years. The annual operating savings is defined as:

AnnualSavings=AnnualMiles*(ICEFuelCostPerMile−EVFuelCostPerMile+ICEMaintCostPerMile−EVMaintCostPerMile)

The second financial quantity used in EBER Tree 300 is a financial payback in years. This is calculated by assuming a net cash flow out at time=0 of:

Initial investment amount=battery cost−investment tax credit

An assumption is made that the cost of the EV drivetrain and controls (e.g. battery) is roughly equal to the cost of the internal combustion engine. This investment amount is then offset every year by the annual operating savings. When the sum of the annual operating savings overcomes the initial investment amount, that year is recorded as the payback in years. There is no discounting of cash flows in this calculation.

Financial payback in years=initial investment amount/AnnualSavings

Both values are calculated and then quantized as inputs to EBER Tree 300.

Figure 8:
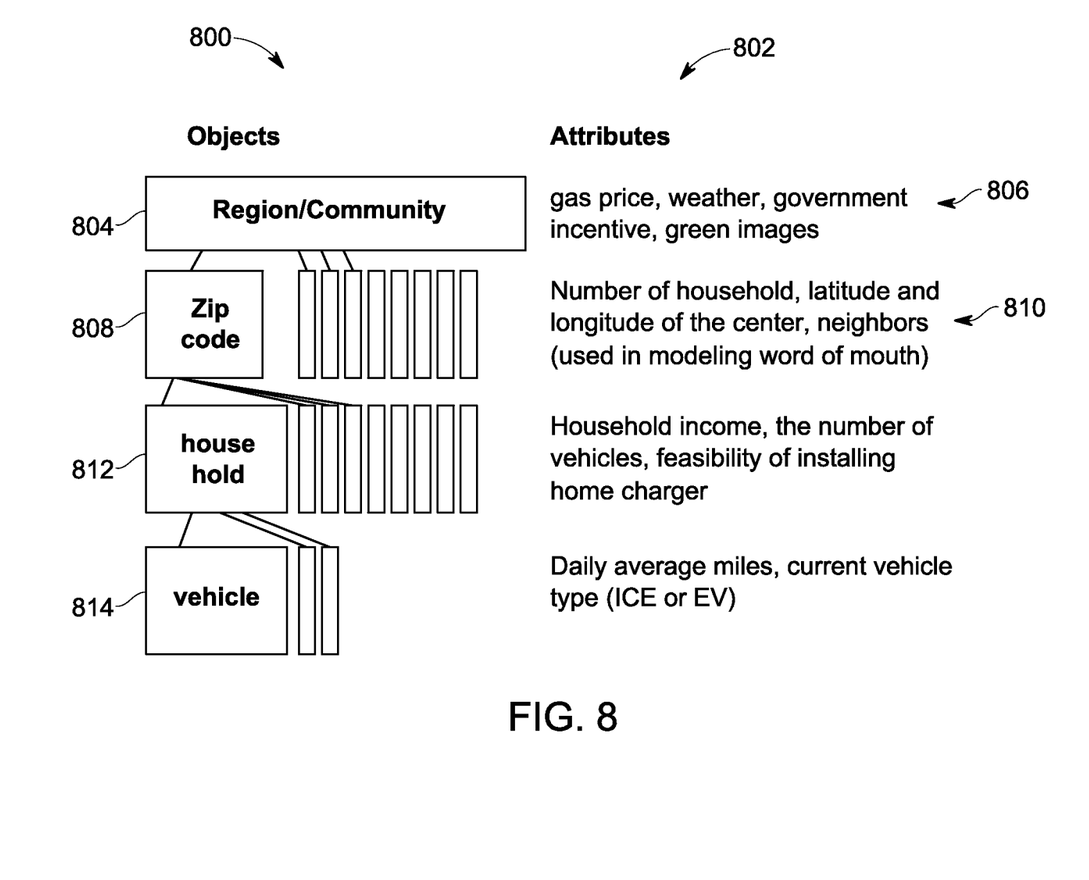
FIG. 8 is a block diagram of an embedded structure of objects in simulations of an EV preference decision model in accordance with an exemplary embodiment of the present disclosure.

FIG. 8 is a block diagram of an embedded structure 800 of objects in simulations of an EV preference decision model in accordance with an exemplary embodiment of the present disclosure. As used herein, a goal of population synthesis is to create a virtual population to represent consumers in the modeled geographic region. Each consumer agent has a plurality of attributes 802 that feeds into its EBER tree 300. Those attributes are determined at several different modeling levels shown in FIG. 8. At the top level of a region or community 804, the attributes describe the macro-level social and economic assumptions 806, such as gas price and government incentive, the green images of an EV car. In the simulation, these factors change over time based on multi-year predictions.

Each community includes a number of zip codes 808. Each zip code 808 can be mapped to a real-world zip code region. US Census provides data 810 at the zip code level. For example, general zip-code level data (e.g. number of households) and geographic information relating to the specific zip codes is collected from US Census.

TABLE 1

Number of vehicles in owner-occupied house in zip code 12211 in 2000

| Number of vehicles | 0 | 1 | 2 | 3 | 4 | >=5 |
|---|---|---|---|---|---|---|
| percentage | 1.9% | 27.2% | 50.4% | 16.7% | 2.7% | 1.2% |

TABLE 2

Number of vehicles in renter-occupied house in zip code 12211 in 2000

| Number of vehicles | 0 | 1 | 2 | 3 | 4 | >=5 |
|---|---|---|---|---|---|---|
| percentage | 7.9% | 39.6% | 43.6% | 5.3% | 0% | 3.6% |

Each zip code has a number of households 812, which can hold one or more vehicles 814. Both households and vehicles are synthetic objects. The latest data of the number of households for each zip code is provided in the 2010 US Census summary table. Any housing unit is either owner-occupied or renter-occupied. Using the conditional distributions of the number of vehicles in each type of household, the number of vehicles in each zip code region is estimated and pairs of vehicles and consumer agents can be created.

Figure 9:
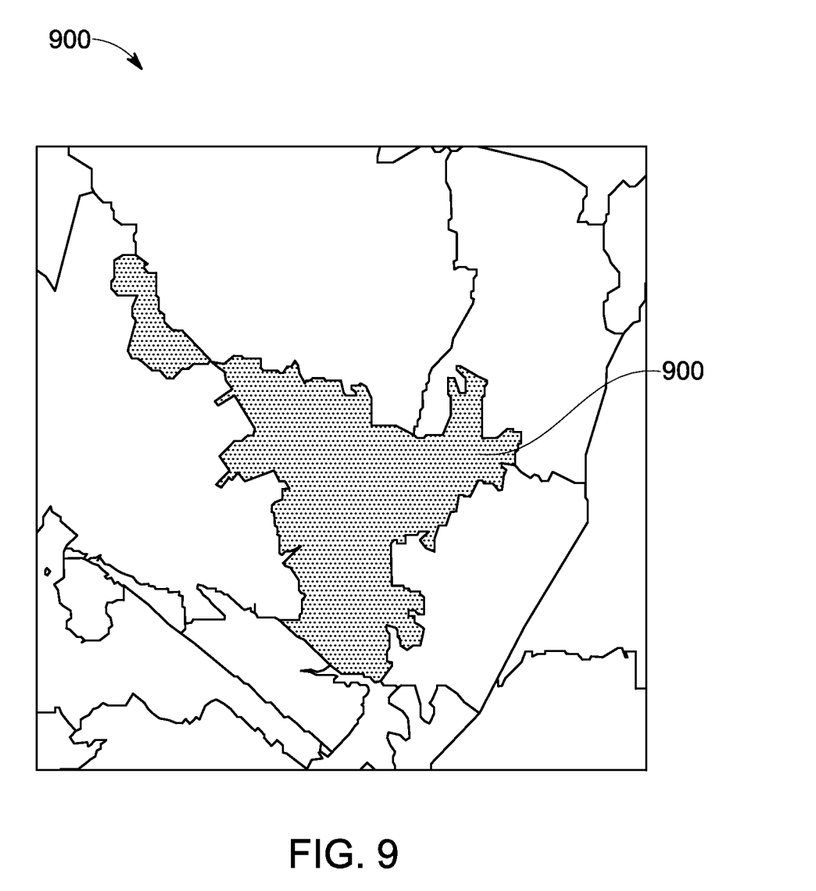
FIG. 9 is a map rendering of a region defined by a zip code 12211 that may be considered for application of the system shown in FIG. 1.

FIG. 9 is a region 900 defined by a zip code 12211, there are 10031 people in 4001 owner-occupied housing units and 792 people in 378 renter-occupied housing units according to 2010 census data for the 12211 zip code. The conditional distributions of a number of vehicles are summarized in Table 1. Based on this information, the total number of vehicles in zip code 12211 is estimated to be 4001*(1.9%*0+27.2%*1+50.4%*2+16.7%*3+2.7%*4+1.2%*5)+378*(7.9%*0+39.6%*1+43.6%*2+5.3%*3+3.6%*5)~8405.

Some of the agent attributes can be directly sampled based on statistics provided by US Census, such as household incomes. However, some attributes doesn't have public statistical data, such as the percentage of housing units qualified for home-charger installation. In later case, assumptions such as each owner-occupied house is qualified to install home chargers, each renter-occupied house is not qualified to install home chargers are used. Such assumptions could be improved by knowledge gained in regional market surveys.

As described above the factors driving adoption are not globally homogeneous but are strongly affected by local considerations. The identification of locations more likely to adopt should be of great interest to many parties. Municipalities and businesses such as shopping centers will need to invest in infrastructure. Electrical utilities may need to improve their delivery system. Accordingly, the functionality of the model acquires location specific data for input to the model and a graphical interface developed to visualize local adoption differences. Modeling locations at the zip code level was chosen because there is significant electronic data availability at the granularity of the zip code level.

US Census data is an exemplary source for data used to create the consumer agents in the model for each zip code of interest. The synthetic population is distributed into each zip code region on a GIS map. With the distance calculation function of the GIS map, a neighborhood for each household is defined to model, for example, the impact of the Word of Mouth (WOM) effect. For example, the neighborhood of a house including all of the households within five miles can be defined. The different impact scope of the WOM effect may influence the speed of adoption increases.

Figure 10:
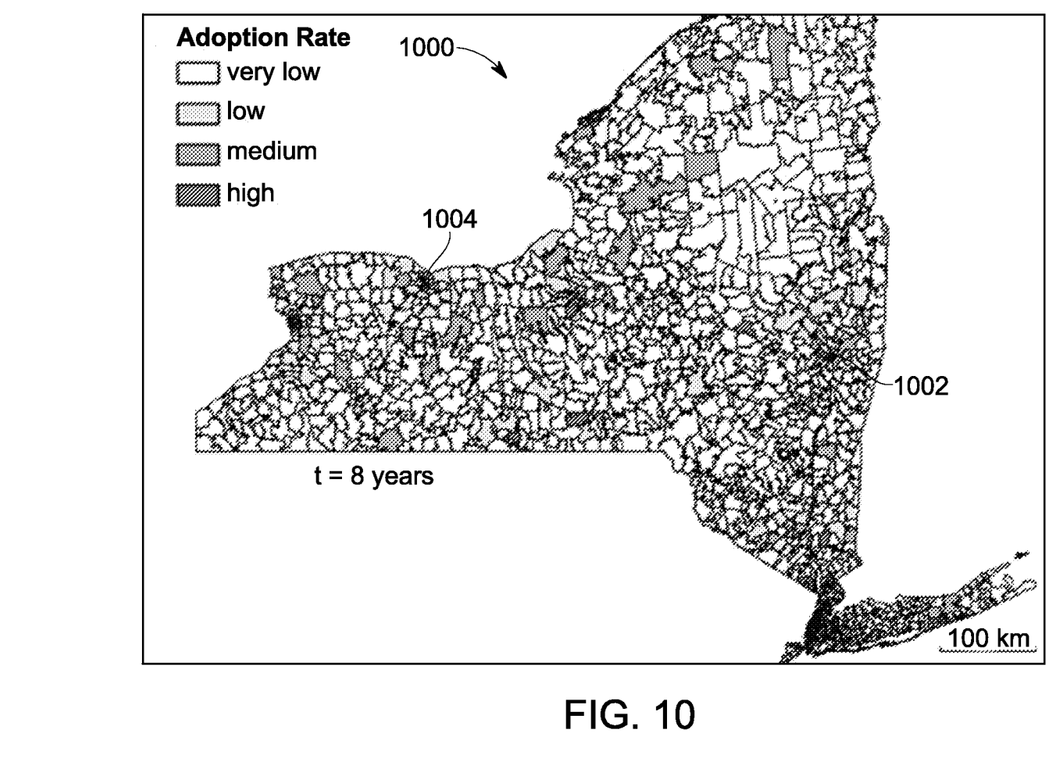
FIG. 10 is a GIS based thematic map that shows a potential distribution of EV adoption in New York State.

FIG. 10 is a GIS based thematic map 1000 that shows a potential distribution of EV adoption in New York State. In the exemplary embodiment, the GIS map also is used as a visualization tool to display the dynamic changes of EV adoption along the simulation time. An adoption rate that is relatively high can be seen proximate some major cities, such as Albany 1002 and Rochester 1004. Because adoption of electric vehicles is in an early stage of development, there may be insufficient historical data with which to form projections. In the absence of such data, techniques that are not dependent on historical data are used. There are many potential factors that can drive the decision to adopt electric vehicles which include but are not limited to financial considerations. Not only is it difficult to determine what these factors are but it is even more challenging to utilize them to estimate adoption, which makes the unique reasoning approach for combining multiple factors described herein ideal.

Because many of the factors driving adoption are highly location specific, the ability to extract information electronically that describe factors at the zip code level are also examined and demonstrated.

As described herein, an agent-based software simulation approach is used to determine adoption rates of Electric Vehicles (EVs). The agent-based model considers the particulars of each candidate vehicle purchaser agent, and then infers its relative preference between electric vehicles and conventional internal combustion (ICE) vehicles. The preference is determined by the EBER reasoning technique.

The overall adoption rate is determined by counting the number of agents that adopt (purchase) an EV during a specific time period. Agent behavior is driven by state charts, one for each agent, that contain rules for state changes such as moving from a potential adopter to an EV owner. The preference for an EV is influenced by a multi-factor tree for each agent that can include granular data such as household income, commute distance, and financial payback.

The model also contains a simplified vehicle supply chain that simulates vehicle supply. The availability of the preferred car can change the purchase decision of the adopter.

The thought processes of potential car buyers is captured using the example based evidential reasoning approach. In this approach, subject matter experts identify the factors felt to affect the buying decision and arrange them in a particular hierarchical tree structure, also determined by the subject matter experts. Factors of various types including outputs from other models are mapped to semantic values in the model. The model is then calibrated based on the expert's response to a set of examples.

Embodiments of the present disclosure enable knowledge capture from subject matter experts and an approach to use that knowledge to quantify adoption rates using an agent-based approach that describes the behavior of individuals in easy to understand visual paradigms. Domain or subject matter experts can easily participate in the design of each agent's behavior. EBER trees are easy to understand both by experts and the user community increasing acceptability of model output. Rules embedded in state-chartered transitions are also easy for both experts and users alike to understand how the model generates its output. Because each agent has its own behavior of model output can be tuned to particular geographic areas by creating agents based on the population information of that area.

Commercially, the output of the model could be used by both businesses and public agencies. To be used to shape the policy, municipal decisions on infrastructure and the utilities power supply requirements. The EV marketplace is large, and it is important to get the best estimates of the adoption of this new technology.

Prior approaches tended to use multiple types of agents which interact strongly with each other. There is an underlying assumption that all agents behave in a logical fashion and are driven by a limited set of factors, mostly financial. These models tend to be difficult for non-modeling experts to understand which tend to reduce the credibility of the output. In contrast, our model is highly transparent even to non-modeling experts. Additionally, the purchasing decision for electric vehicles is not always highly logical but can be based on other subjective types of factors such as image enhancement. The incorporation of expert reasoning allows or model to utilize many different types of factors that tend impact the purchasing decision.

The method described has the ability for each agent to reason over a large number of facts that affect their preference for electric vehicles.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by processor 104, including RAM memory, ROM memory, EPROM memory, EEPROM memory, and non-volatile RAM (NVRAM) memory. The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect includes receiving a set of factors, determined by an expert in the technology area wherein the received set of factors represent facts to be considered in determining the adoption rate. Also, applying the set of factors to a plurality of agent models, each agent model representing one or more of the users and wherein each of the agent models includes a hierarchical reasoning algorithm including a plurality of decision nodes and wherein each algorithm is configured to generate a score for the hierarchical reasoning algorithm based on the applied set of factors. The technical effect also includes applying the generated scores to an adoption forecasting model configured to combine the scores of the agent models to generate an adoption rate for the population based on the applied set of factors, and outputting the generated adoption rate to a user. Any such resulting program, having computer-readable code means, may be embodied or provided within one or more computer-readable media, thereby making a computer program product, i.e., an article of manufacture, according to the discussed embodiments of the disclosure. The computer readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

Many of the functional units described in this specification have been labeled as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays (FPGAs), programmable array logic, programmable logic devices (PLDs) or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The above-described embodiments of a method and system for determining an adoption rate of a trend by a plurality of potential adopters defining a population provides a cost-effective and reliable means for evaluating a plurality of agent-based eventual reasoning models to determine an adoption rate for a trend. More specifically, the methods and systems described herein facilitate simulating the behavior of a plurality of individuals of a population to ascertain an adoption rate for the entire population. In addition, the above-described methods and systems facilitate evaluating factors local to an area smaller than the area enclosing the entire population to improve accuracy. As a result, the methods and systems described herein facilitate determining the adoption rate of a plurality of potential adopters in a population in a cost-effective and reliable manner.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An agent-based evidential reasoning decision computer system for determining an adoption rate of a trend, the system comprising a processor and a computer-readable storage device having encoded thereon computer-executable instructions that are executable by the processor to perform functions, the system further comprising:

a plurality of nodes arranged in a tree structure, a topology of the tree structure determined by a subject matter expert in an area of the decision, the topology defining a hierarchy of the tree structure and an interconnection of the nodes, the plurality of nodes defining an evidential reasoning algorithm where lower level nodes receive factors to be considered in the decision, each node assigns a likelihood of an outcome of the received factors, and generates an output to a subsequent higher level node or root of the tree structure;

a plurality of agent models organized in a hierarchical structure, each agent model comprising a respective set of the plurality of nodes and an output of the agent model, each agent model representing at least one of a member of a population and a subset of the population; and an aggregator algorithm configured to combine the outputs of the plurality of agent models to generate an output representing an adoption rate.

2. The computer system of claim 1, wherein said aggregator algorithm comprises a Bass diffusion model.

3. The computer system of claim 2, wherein the elements of the Bass diffusion model include at least one of financial payback, age of existing vehicle, commute distance of user, availability of charger infrastructure, and manufacturing supply constraints.

4. The computer system of claim 1, wherein the evidential reasoning algorithm is used to assign a belief in the decision at each node where additional factors are considered, the belief represented by a certainty factor that ranges from absolute belief to absolute disbelief.

* * * * *